US005656071A

United States Patent [19]

Kappele et al.

[11] Patent Number: 5,656,071
[45] Date of Patent: Aug. 12, 1997

[54] INK COMPOSITIONS

[75] Inventors: William David Kappele, Lexington; Anna Marie Pearson, Richmond, both of Ky.

[73] Assignee: Lexmark International, Inc., Lexington, Ky.

[21] Appl. No.: 667,268

[22] Filed: Jun. 20, 1996

Related U.S. Application Data

[63] Continuation-in-part of Ser. No. 577,962, Dec. 26, 1995.
[51] Int. Cl.⁶ .................................................. C09D 11/02
[52] U.S. Cl. ...................... 106/31.76; 106/311; 106/31.86
[58] Field of Search ................................ 106/20 R, 20 D, 106/311, 499

[56] References Cited

U.S. PATENT DOCUMENTS

| | | | |
|---|---|---|---|
| 4,469,840 | 9/1984 | Alberts et al. | 524/500 |
| 4,597,794 | 7/1986 | Ohta et al. | 106/20 |
| 4,778,862 | 10/1988 | Woo et al. | 525/479 |
| 5,019,166 | 5/1991 | Schwarz | 106/22 |
| 5,032,647 | 7/1991 | Spinelli | 525/326.5 |
| 5,036,139 | 7/1991 | Spinelli | 525/326.5 |
| 5,085,698 | 2/1992 | Ma et al. | 106/20 |
| 5,086,307 | 2/1992 | Noguchi et al. | 346/140 |
| 5,141,556 | 8/1992 | Matrick | 106/22 R |
| 5,180,425 | 1/1993 | Matrick et al. | 106/22 R |
| 5,187,244 | 2/1993 | Sugimori et al. | 525/479 |
| 5,219,945 | 6/1993 | Dicker et al. | 525/276 |
| 5,221,334 | 6/1993 | Ma et al. | 106/20 |
| 5,254,425 | 10/1993 | Suzuki et al. | 430/115 |
| 5,302,197 | 4/1994 | Wickramanayke et al. | 106/22 |
| 5,310,778 | 5/1994 | Shor et al. | 524/556 |
| 5,320,668 | 6/1994 | Shields et al. | 106/23 R |
| 5,356,464 | 10/1994 | Hickma et al. | 106/22 R |
| 5,418,277 | 5/1995 | Ma et al. | 524/520 |

FOREIGN PATENT DOCUMENTS 603469  9/1993  European Pat. Off. ........ C09D 11/00

*Primary Examiner*—Helene Klemanski

[57] ABSTRACT

The invention relates to an aqueous ink composition for use in ink jet printers comprising an aqueous carrier, an insoluble pigment, a polymeric dispersant, and a specific cosolvent mixture comprising 1,3-propanediol or 1,4-butanediol with a second component selected from polyethylene glycol-type materials and polyol/alkylene oxide condensates. The ink compositions demonstrate excellent stability, good maintenance characteristics for the printers in which they are used, and excellent optical density and print characteristics.

18 Claims, No Drawings

INK COMPOSITIONS

This application is a continuation-in-part of U.S. patent application Ser. No. 08/577,962, Kappele, et al., filed Dec. 26, 1995.

TECHNICAL FIELD

The present invention relates to ink compositions used in ink jet printers.

BACKGROUND OF THE INVENTION

Ink jet printing is accomplished by ejecting ink from a nozzle toward paper or another print medium. The ink may be driven toward the medium in a variety of ways. For example, in electrostatic printing, the ink is driven from a nozzle toward a medium by an electrostatic field. Another ink jet printing procedure, known as squeeze tube, employs a piezo-electric element in the ink nozzle. Electrically-caused distortions of the piezo-electric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Ink compositions used in ink jet printers generally comprise deionized water, a water-soluble or water-miscible organic solvent, and a colorant. Generally, the colorant is a soluble dye. Unfortunately, inks comprising soluble dyes can exhibit many problems, such as poor water-fastness, poor light-fastness, clogging of the jetting channels as a result of solvent evaporation and changes in the dye's solubility, dye crystallization, poor print quality including ink bleeding and leathering, poor thermal stability, chemical instability, and ease of oxidation.

Many of these problems can be overcome by replacing the soluble dyes used in the ink formulations with insoluble pigments. In general, pigments have superior properties when compared to dyes, particularly in terms of water-fastness, light-fastness, thermal stability, oxidative stability, and compatibility with both coated/treated and plain papers. However, because the pigments are insoluble in the ink composition and must, therefore, be included as a dispersion, a new set of problems arises. Stability of the ink is critical, both in terms of maintaining uniformity of properties and assuring that pigment does not clog the ink jets during gaps in usage. The ideal, both for stability and cost reasons, of course, would be to utilize the minimum amount of pigment necessary in the ink composition. However, decreasing the amount of pigment in the ink compositions can lead to images having poor optical densities. Further, because of the compositional balancing required to assure the necessary stability, it is also important to assure that the composition has an appropriate viscosity for use in an ink jet printer, as well as good printing properties such as good water-fastness, light-fastness, and minimized running and leathering when applied to the paper. It has been very difficult to develop an ink formulation which optimizes all of these properties. The general approach has been to adjust the dispersants and solvent systems of ink compositions in an attempt to balance and optimize these often competing properties. Prior to the present invention, however, a formulation which optimizes all of these properties had not been achieved without requiring the use of specific polymeric dispersants.

U.S. Pat. No. 5,180,425, Mattick, et at., issued Jan. 19, 1993, describes ink jet ink compositions which include an aqueous carrier medium, a pigment dispersion, and a polyol/alkylene oxide cosolvent. These inks are taught to provide long functional life to ink jet printers and to resist film formation. Lipohic EG-1 is one of the preferred cosolvents disclosed. Other optional solvents which may be used in the described invention include polyethylene glycol.

U.S. Pat. No. 5,302,197, Wickramanayke, issued Apr. 12, 1994, describes aqueous ink jet ink compositions which comprise a pigment dispersion, an aqueous carrier medium, and a cosolvent mixture which includes a polyol/alkylene oxide condensate together with a cyclic amide derivative. Liponic EG-1 is taught to be useful as the polyol/alkylene oxide condensate component.

European Patent Application 603,469, Chan, et at., published Jun. 29, 1994, describes ink jet inks comprising an aqueous carrier medium, specifically-defined alkyl polyol ether cosolvents, and a pigment dispersion (pigment particles stabilized by a dispersant). These inks are taught to provide a good balance of viscosity, surface tension, resistance to nozzle pluggage, print quality, light stability and smear and water resistance. The solvents which may be used in the disclosed invention include 1,2,3-butanetriol.

U.S. Pat. No. 4,597,794, Ohta, et al, issued Jul. 1, 1986, describes an ink formulation used in ink jet printing processes which is said to form a clear image and have good physical properties. Specifically disclosed solvents for use in the ink include polyethylene glycol and 1,2,6-hexanetriol.

It has now been discovered that the use of a very specific cosolvent mixture containing 1,3-propanediol or 1,4-butanediol together with either (a) a low molecular weight polyethylene glycol or related compound or (b) a polyol/alkylene oxide condensate, in an aqueous ink composition containing a dispersion of an insoluble pigment, provides a unique blend of optimized properties. Specifically, these compositions provide excellent properties in terms of stability, optical density (even when low levels of pigment are utilized), viscosity, printing characteristics (water-fastness, light-fastness, minimized leathering, minimized running of ink on the printed page), and printer maintenance problems (i.e., minimized clogging of the printer jets during gaps in printer usage). None of the patents, discussed above, describes or suggests the specific cosolvent combinations of the present invention.

It is, therefore, an object of the present invention to provide an improved pigmented ink composition for ink jet printers which comprises a very specific cosolvent system.

Other objects and advantages of the present invention will become apparent from the following disclosure.

SUMMARY OF THE INVENTION

In a first aspect, the present invention relates to an aqueous ink composition suitable for use in ink jet printers comprising:
  (a) from about 1% to about 10% of a pigment;
  (b) from about 0.1% to about 10% of a polymeric dispersant for said pigment;
  (c) from about 50% to about 93% of an aqueous carrier; and
  (d) from about 5% to about 40% of a cosolvent mixture comprising (1) 1,3-propanediol or 1,4-butanediol, and
    (2) a material selected from the group consisting of:
      (i) polyethylene glycols, and poly(ethylene)(propylene) glycols, having a molecular weight of from about 200 to about 3,400;

(ii) a polyol/alkylene oxide condensate having the formula

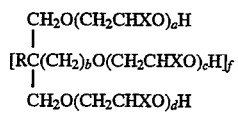

wherein X is H or $CH_3$, R is H, $C_1$–$C_4$ alkyl or $CH_2O(CH_2CH_2O)_eH$, b is 0 or 1, a+d+f (c+e) is from about 2 to about 100, and f is from about 1 to about 6; and (iii) mixtures thereof;

wherein the weight ratio (1):(2) is from about 70:30 to about 30:70.

In a second aspect, the instant invention is directed to a cosolvent mixture as described in (d).

All percentages and ratios used herein are "by weight" unless otherwise specified. All molecular weights, used herein, are number average molecular weights unless otherwise specified.

DETAILED DESCRIPTION OF THE INVENTION

The present invention relates to aqueous ink compositions suitable for use in ink jet printers. These compositions contain an insoluble pigment, a polymeric dispersant for the pigment (the pigment and the dispersant being present in the composition as a dispersion), an aqueous carrier, and a specifically-defined cosolvent mixture. Each of these required components, as well as some optional components, will be described in detail below.

The polymeric dispersant is included in the compositions of the present invention in an mount of from about 0.1% to about 10%, preferably from about 0.25% to about 5%, most preferably from about 0.5% to about 4%, of the final composition. Polymeric dispersants suitable for use in the present invention include any of the anionic, cationic or nonionic polymers known in the art as suitable for use as dispersants in ink jet ink preparations. Examples of such materials are described in U.S. Pat. No. 5,310,778, Shor, et at., issued May 10, 1994, incorporated herein by reference. Such polymeric dispersants may be homopolymers, copolymers, branched polymers or graft polymers. They may be random or block polymers.

AB, BAB and ABC block interpolymers represent one type of polymeric dispersants useful in the present invention. Preferred are AB, BAB and ABC block interpolymers derived from at least one alkyl acrylic or methacrylic acid ester and amine-substituted acrylic or methacrylic ester monomers. Preferred AB and BAB block interpolymers and their process of preparation are described in U.S. Pat. No. 5,085,698, Ma, et al., issued Feb. 4, 1992, incorporated herein by reference.

The polymeric dispersants useful in the present invention generally include both hydrophobic and hydrophilic polymeric segments, the hydrophobic segments tending to bind with the pigment particles in the ink composition and the hydrophilic segments tending to be solvated by the liquid ink medium thereby serving to stabilize the dispersion by steric and/or ionic mechanisms.

A preferred class of polymeric stabilizers for use in the present invention include block or graft copolymers comprising a hydrophilic polymeric segment and a hydrophobic polymeric segment which includes a hydrolyrically stable siloxyl substituent. A particularly preferred subgroup of these dispersants are graft copolymers which comprise a hydrophilic polymeric segment (particularly an acrylate or methacrylate copolymer) together with a hydrophobic polymeric segment derived from the macromer having the formula:

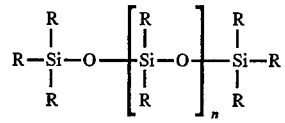

wherein n is from 2 to 16 and each R is independently a lower alkyl ($C_1$–$C_6$) or siloxyl. These materials are disclosed in U.S. patent application Ser. No. 08/360,199, Beach, et al., filed Dec. 21, 1994, incorporated herein by reference.

Another class of preferred polymeric dispersants include graft copolymers, having a molecular weight of from about 1,500 to about 20,000, comprising:

(a) a hydrophilic polymeric segment;

(b) a hydrophobic polymeric segment, having a molecular weight of from about 400 to about 3,000, which incorporates a hydrolytically stable siloxyl substituent; and (c) a stabilizing segment having a molecular weight of from about 200 to about 2,000, selected from the group consisting of reactive surfactant macromers, protective colloid macromers, and non-siloxyl hydrophobic monomers.

The preferred monomer ratio (a):(b) is from about 10:1 to about 100:1, while the preferred monomer ratio (b):(c) is from about 1:0.5 to about 1:5. The preferred hydrophilic polymer segments include a carboxy substituent and are most preferably acrylate or methacrylate polymeric materials. The preferred siloxane-containing hydrophobic polymeric segment is an acryloyl- or methacryloyl-terminated polydialkylsiloxane macromer. Most preferred hydrophobic segments have a molecular weight of from about 400 to about 2,000 and incorporate a dimethylpolysiloxy group. Preferred stabilizing segments include stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from about 1 to about 40; nonylphenoxy poly(ethyleneoxy)$_n$ acrylate, wherein n is from about 1 to about 40; methoxypoly(ethyleneoxy)$_n$ methacrylate, wherein n is from about 5 to about 40; methoxypoly(ethyleneoxy)$_n$ acrylate, wherein n is from about 5 to about 40; stearyloxypoly (ethyleneoxy)$_n$ methacrylate, wherein n is from about 1 to about 20; stearyloxypoly(ethyleneoxy)$_n$ acrylate, wherein n is from about 1 to about 20; fluorinated $C_1$–$C_{18}$ alkyl methacrylate; fluorinated $C_1$–$C_{18}$ alkyl acrylate; poly (propylene glycol) methyl ether methacrylate; poly (propylene glycol) methyl ether acrylate; poly(propylene glycol) 4-nonylphenyl ether methacrylate; poly(propylene glycol) 4-nonylphenyl ether acrylate; methacryloxy-trimethylsiloxy-terminated polyethylene oxide; acryloxy-trimethylsiloxy-terminated polyethylene oxide; and mixtures thereof.

The most preferred polymeric dispersant of this class comprises in its backbone the structural formula

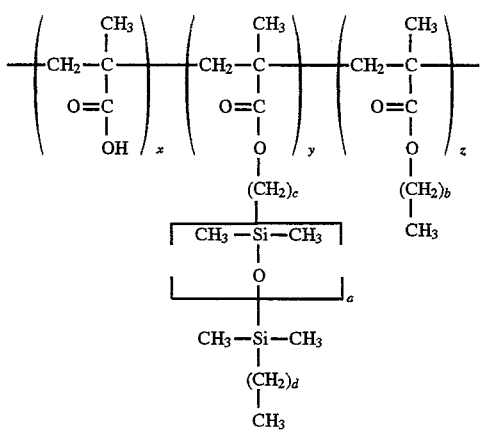

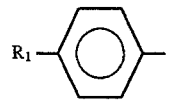

wherein x is from about 5 to about 100, preferably from about 15 to about 50; y is from about 1 to about 2, preferably about 1; z is from about 1 to about 5, preferably about 1; a is from about 3 to about 45, preferably about 9; b is from about 3 to about 29, preferably from about 15 to about 17; c is from about 2 to 5 about 8, preferably about 3; and d is from 0 to about 7, preferably about 3. It is also noted, however, that it is within the scope of this invention for all structural units represented by x, y, and z herein to be randomly dispersed throughout the polymer backbone. These polymeric dispersants are disclosed in a concurrently-filed U.S. patent application entitled "Polymeric Dispersants For Pigmented Ink, Beach, et al., incorporated herein by reference. It is noted herein that the end groups on the dispersants of this invention are not limited. For illustrative purposes, they can include thio-substituted hydrocarbons, as well as hydrogen.

Another group of preferred polymeric dispersants are those described in U.S. patent application Ser. No. 08/360,200, Beach, et al., filed Dec. 21, 1994, now U.S. Pat. No. 5,589,522, incorporated herein by reference. These materials are graft polymers which comprise a hydrophilic polyacrylic acid backbone of weight average molecular weight between about 1,000 and about 5,000, and hydrophobic segment side chains preferably with one side chain attached to one backbone chain. Preferred polymers of this class are those comprising in its backbone one of the following structural formulas:

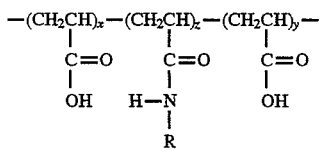

where x+y is from about 20 to about 200, z is from about 1 to about 10, and R is $C_6$–$C_{36}$ alkyl or where $R_1$ is a $C_4$–$C_{20}$ alkyl; or

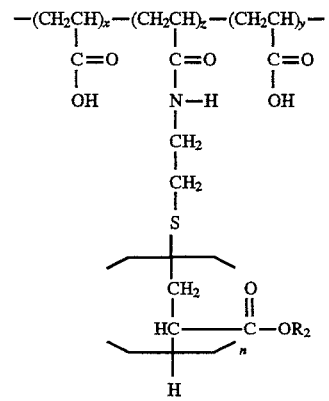

where x+y is from about 20 to about 200, z is from about 1 to about 10, n is from about 2 to about 40 and $R_2$ is alkyl or aryl, preferably butyl; or

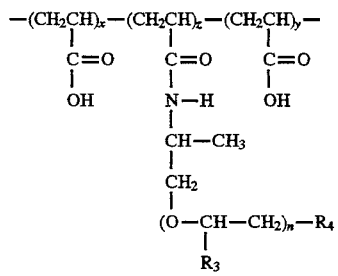

where x+y is from about 20 to about 200, z is from about 1 to about 10, $R_3$ is H or $CH_3$, $R_4$ is H, $CH_3$ or $OCR_3$, and n is from about 10 to about 60; or those having the formula

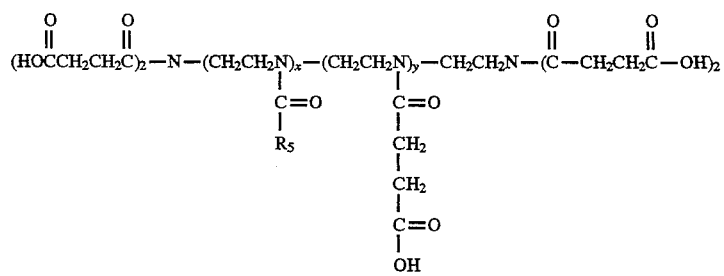

where y is from about 6 to about 20, x is from about 1 to about 5 and $R_5$ is a $C_6$–$C_{30}$ alkyl.

The graft copolymer dispersants of the present invention require a relatively low molecular weight in order to achieve the particle stability and low viscosity required for use in stable ink jet printing inks. This may result in the selection of a polar solvent polymerization process for making the copolymers. Such a process controls the molecular weight and uniformity of the copolymers by maintaining solubility of all the starting materials (free radical initiator, hydrophobic and hydrophilic monomers, and chain transfer agents), as well as the resultant copolymer. Since the synthesized copolymer needs to be suspended in an aqueous medium in order to be formulated for ink jet printing, it is necessary to recover the copolymer from the polar organic solvent in the reaction mixture and dissolve it in water. A typical copolymer recovery process from a polar polymerization solvent would comprise the following steps:

1. adding the copolymer solution to a non-solvent, such as hexane, in order to precipitate the copolymer out of solution, thereby purifying it;
2. vacuum filtering the precipitate; and
3. drying the copolymer precipitate.

The copolymer powder could then be dissolved in an aqueous base and used in the preparation of an ink jet printing ink. This process can be costly and unnecessarily complicated.

Preferred processes for the recovery of the copolymer dispersant from the polar organic polymerization solvent not only simplify the recovery of the copolymer dispersant, but also result in improved print quality properties for ink jet inks made from those dispersants in that the tendency of the inks to form satellites and splatter is reduced. Specifically, these preferred processes are:

1. solvent stripping followed by dissolution in the aqueous base; and
2. solvent exchange.

In the solvent stripping and dissolution process, the polar solvent is first stripped from the copolymer by a standard process that can convert the copolymer solution to a dry powder, such as vacuum tray drying, rotary evaporator drying, drum drying, rotary cylindrical vacuum drying, or spray drying. The dry copolymer powder is then dissolved in the aqueous base so that it can be used in the preparation of pigmented ink jet inks.

In the solvent exchange process, from about 35% to about 60% (preferably about 50%) of the polar solvent in the polymerization reactor is distilled off and deionized water and aqueous base (e.g., a KOH solution) is added to adjust the pH to from about 4.5 to about 6.5, preferably about 5. For a polar solvent with a boiling point lower than that of water, the temperature of this mixture is slowly increased to distill off the solvent until the temperature reaches about 100° C. at which time all polar organic solvent is removed. (This process could not be used where the polar solvent has a boiling point greater than that of water.) Additional aqueous base (e.g., a KOH solution) is added to the solution to raise the pH to from about 7 to about 8.5, preferably about 7.5. The solution is then ready for use in formulating a pigmented ink jet ink.

The second component of the ink composition of the present invention is the pigment, an insoluble colorant. The pigment is present in the compositions of the present invention at from about 0.1% to about 10%, preferably from about 0.25% to about 5%, most preferably from about 0.5% to about 4% of the final composition. Indeed, one of the important advantages of the present invention is that it allows formulation of inks having low levels of pigment (e.g., between 0.5 and 4%) while still providing print of high quality and excellent optical density. The pigments useful in the present invention are any of the conventional pigments known in the art, such as those disclosed in U.S. Pat. No. 5,085,698, Ma, et al., issued Feb. 4, 1992, incorporated herein by reference. The pigments may be used individually or in combination.

The pigment particles should be sufficiently small to permit free flow of the ink through the ink jet printing device, especially at the ejecting nozzles which usually have a diameter ranging from about 10 microns to about 50 microns. The particle size also has an influence on the pigment dispersion stability, which is critical throughout the life of the ink. Brownian motion of minute particles will help prevent the particles from flocculation, thereby providing a more stable product. The range of useful particle size is from about 0.05 microns to about 15 microns. Preferably, the pigment particle size ranges from about 0.05 micron to about 5 microns and, most preferably, from about 0.05 micron to about 1 micron. The pigments may be used in dry or wet form. For example, pigments are usually manufactured in aqueous media and the resulting pigment is obtained as water wet presscake. In presscake form, the pigment is not agglomerated to the extent that it is in dry form. Thus, pigments in water wet presscake form do not require as much deflocculation in the process of preparing the inks as do dry pigments.

Fine particles of metal or metal oxides may also be used to practice the present invention. For example, metal and metal oxides are suitable for the preparation of magnetic ink jet inks. Fine particle size oxides, such as silica, alumina, titania, and the like, may also be used. Furthermore, freely divided metal particles, such as copper, iron, steel, aluminum and alloys, may be selected for appropriate applications.

Examples of pigments which may be used in the present invention include azo pigments, such as azo lakes, condensed azo pigments, and chelate azo pigments; polycyclic pigments, such as phthalocyanine pigments, perylene pigments, anthraquinone pigments, quinacridone pigments, dioxazine pigments, thioindigo pigments, isoindolinone pigments, and quinophthalone pigments; dye lakes, such as basic dye lakes and acid dye lakes; organic pigments, such as nitro pigments, nitroso pigments, aniline black, and daylight fluorescent pigments; and inorganic pigments, such as titanium oxide, iron oxide, and carbon black. Preferred pigments for use in the present invention include titanium oxide, iron oxide and carbon black. Examples of commercially available pigments which may be used in the present invention include the following: Heliogen® Blue L 6901F (BASF), Heliogen® Blue NBD 7010 (BASF), Heliogen® Blue K 7090 (BASF), Heucophthal® Blue G XBT-583D (Heubach), Irgalite® Rubine 4BL (Ciba-Geigy), Quindo® Magenta (Mobay), Indofast® Brilliant Scarlet (Mobay), Hostaperm® Scarlet GO (Hoechst), Permanent Rubine F6B (Hoechst), Monastral® Scarlet (Ciba-Geigy), Raven® 1170 (Col. Chem.), Special Black 4A (Degussa), Black FW18 (Degussa), Sterling® NS Black (Cabot), Sterling® NSX 76 (Cabot), Monarch® 880 (Cabot), Tipure® R-101 (DuPont), Mogul L (Cabot), BK 8200 (Paul Uhlich), Heliogen® Green K 8683 (BASF), Heliogen® Green L 9140 (BASF), Monastral® Red B (Ciba-Geigy), Monastral® Violet R (Ciba-Geigy), Hostaperm® Orange GR (Hoechst), Paliogen® Orange (BASF), L75-2377 Yellow (Sun Chem.), L74-1357 Yellow (Sun Chem.), Hostaperm® Yellow H4G (Hoechst), Irgazin® Yellow 5GT (Ciba-Geigy), Permanent Yellow G3R-01 (Hoechst), Novoperm® Yellow FGL (Hoechst), Chromophthal® Yellow 3G (Ciba-Geigy), Hansa Yellow X (Hoechst), Dalamar® Yellow YT-858-D (Heubach), and Hansa Brilliant Yellow 5GX-02 (Hoechst).

The third component of the ink composition of the present invention is the aqueous carrier medium. This component comprises water (preferably deionized water) or a mixture of water with at least one water-soluble organic solvent. The aqueous carrier component is present at from about 50% to about 93%, preferably from about 70% to about 80%, of the compositions of the present invention. Selection of a suitable mixture depends on the requirements of the specific ink being formulated, such as the desired surface tension and viscosity, the pigment being used, the drying time required for the pigmented ink, and the type of paper onto which the ink will be printed. Representative examples of water soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or keto alcohols, such as acetone, methyl ethyl ketone, and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, glycerol, 2-methyl-2,4-pentanediol, 1,2,6-hexanetriol and thiodiglycol; (6) lower alkyl mono- or diethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, 1-(2-hydroxyethyl)-2-pyrrolidone and 1,3-dimethyl-2-imidazolidinone; and (8) sulfur-containing compounds, such as dimethyl sulfoxide and tetramethylene sulfone. Other useful solvents include lactones and lactams.

Where mixtures of water and an organic solvent are used as the carrier medium in the present invention, the medium usually contains from about 25% water/75% organic solvent to about 99.9% water/0.1% organic solvent. The preferred ratios are from about 50% water/50% organic solvent to about 99.9% water/0.1% organic solvent. These percentages are based on the total weight of the aqueous carrier medium. It is to be understood that, as used herein, the term "organic solvent", which may be utilized in the aqueous carrier medium, is not intended to include the specific materials which are utilized in the cosolvent component of the present invention.

Preferred organic solvents for use in the aqueous carrier medium component of the present invention include polyhydric alcohols, such as ethylene glycol, 1,2,6-hexanetriol, thiodiglycol, hexylene glycol and diethylene glycol; diols, such as pentanediol, hexanediol, and homologous diols; glycol ethers, such as propylene glycol laureate; glycerol; and lower alkyl ethers of polyhydric alcohols, such as ethylene glycol monomethyl (or monoethyl) ether, diethylene glycol methyl (or ethyl) ether, and triethylene glycol monomethyl (or monoethyl) ether; alcohols, such as methanol, ethanol, propanol, and butanol; ketones, such as acetone; ethers, such as tetrahydrofuran and dioxane; ethers, such as ethyl acetate, sulfolanes, N-methyl pyrrolidone, lactones such as γ-butyrolactone, lactams such as 2-pyrrolidone, 1-methyl-2-pyrrolidone. Although the organic solvents may impart useful properties, such as faster dry time, reduced bleed and increased penetration, to the ink compositions, they generally (in contrast to the cosolvent materials defined herein) do not improve optical density, composition stability or print quality. Particularly preferred organic solvents include 1,5-pentanediol, 1,6-hexanediol, 1,7-heptanediol, n-propanol, and mixtures thereof.

The final required component for use in the compositions of the present invention is the cosolvent mixture which comprises from about 5% to about 40%, preferably from about 5% to about 30%, more preferably from about 10% to about 20%, of the final composition. This cosolvent mixture contains a first component which is 1,3-propanediol, 1,4-butanediol, or a mixture of these materials. 1,3-propanediol is preferred. In addition, it also contains a second component which is a polyethylene glycol-type compound, a polyol/alkylene oxide condensate, or a mixture of those compounds. The second component used in this cosolvent mixture may be a polyethylene glycol, or a mixed poly(ethylene) (propylene) glycol, having a molecular weight of from about 200 to about 3,400 and often from about 200 to about 600. Polyethylene glycols (PEG) are preferred, with polyethylene glycol having a molecular weight of about 400 being particularly preferred. The second component in the cosolvent may also be a polyol/alkylene oxide condensate having the formula

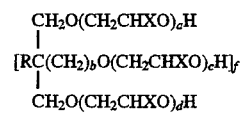

wherein x is H or $CH_3$, R is H, $C_1-C_4$ alkyl or $—CH_2O(CH_2CH_2O)_eH$, b is 0 or 1, a+d+f (e+e) is from about 2 to about 100, and f is from about 1 to about 6.

The polyol/alkylene oxide condensate compounds useful in the present invention are reaction products of a polyol and an alkylene oxide. They are described in U.S. Pat. No. 5,180,425, Matrick, et al., issued Jan. 19, 1993, incorporated hereby by reference. These compounds generally have a solubility in water of at least about 4.5% (i.e., 4.5 parts in 100 parts of water) at 25° C. The alkylene oxide used in these compounds is either ethylene oxide or propylene oxide or combinations of both oxides. Reaction with a single alkylene oxide can produce mixtures of compounds with varying degrees of oxyalkylation so that the structures illustrated are based on average compositions which may contain a range of alkylene oxide units. Random and block copolymer chains of propylene and ethylene oxides may be employed. The polyol reacted with the alkylene oxide may contain three or more hydroxyl groups. Useful triols are glycerol, trimethylol propane, and trimethylol ethane. Others, such as 1,2,4-butanetriol and 1,2,6-hexanetriol may also be used. Pentaerythritol, di-(trimethylol propane), and methyl glucosides are among the useful tetrols. Glucose, a pentol, may be used. Sorbitol is a useful hexol. Other useful hexols include dipentaerythritol and inositol. Diols are not generally suitable for use in the present invention because their alkylene oxide condensates are generally not compatible with pigment dispersions. One exception may be alkylene oxide condensates of neopentyl glycol.

Some examples of polyol/alkylene oxide condensates are as follows:

| Product | R | a + d + f (c + e) | b | f |
|---|---|---|---|---|
| Liponic ® EG-1[1] | —H | 26 | 0 | 1 |
| Liponic ® SO-20[1] | —H | 20 | 0 | 4 |
| Photonol ® PHO-7149[2] | —C$_2$H$_5$ | 2.7 | 1 | 1 |
| Photonol ® PHO-7155[2] | —C$_2$H$_5$ | 7.4 | 1 | 1 |
| Voranol ® 230-660[3] | —CH$_3$ | 3.0 | 1 | 1 |
| Voranol ® 234-630[3] | —C$_2$H$_5$ | 3.0 | 1 | 1 |
| Fomrez ® T-279[4] | —C$_2$H$_5$ | 3.1 | 1 | 1 |
| Fomrez ® T-315[4] | —C$_2$H$_5$ | 4.1 | 1 | 1 |

[1]Lipo Chemicals Co., Paterson, N.J.
[2]Henkel Corp., Ambler, PA
[3]Dow Chemical Co., Midland, MI
[4]Witco Corp., Organic Division, New York, NY A particularly preferred polyol/alkylene oxide condensate for use in the present invention is Liponic EG-1, described above. This material, which has the CTFA name glycereth-26, is the 26 mole ethylene oxide adduct of glycerine and is commercially available from Lipo Chemicals, Inc., Paterson, N.J.

The first and second components of the cosolvent mixture are present in a weight ratio (first component:second component) of from about 70:30 to about 30:70. Where the cosolvent mixture contains a polyethylene glycol (PEG)-type compound and either 1,3-propanediol or 1,4-butanediol, the optimum PEG:diol weight ratio is from about 50:50 to about 70:30. Where the cosolvent mixture contains a polyol/alkylene oxide condensate compound together with 1,3-propoanediol or 1,4-butanediol, the optimum condensate:diol ratio is from about 30:70 to about 50:50. In general, the most preferred ratio of cosolvent components is about 50:50.

The ink composition of the present invention may be prepared by any method known in the art for making such compositions. The key aspect of the composition is that the pigment and polymeric dispersant form a stable dispersion in the aqueous carrier/cosolvent mixture. In one method, the pigment and polymeric dispersant are first mixed together. The resulting millbase is then milled in an attritor to reduce the particle size to an acceptable level. This material is then blended with the other ink components and water to yield the desired concentration of ink. Optionally, a surfactant may be added to enhance the pigment dispersion and modify the surface tension of the ink to control its penetration into the paper. Suitable surfactants include nonionic, amphoteric and ionic surfactants. Other additives, such as biocides, humectants, chelating agents, and viscosity modifiers, may be added to the ink compositions at their art-established levels to achieve their art-known benefits.

The process for preparing pigmented ink jet inks typically requires that they have their particles reduced in size using a grinding mill. It is desired that the inks have a shelf life stability of two years or more and that the only limitation regarding pigment particle size is that the size selected is one which is capable of producing the above described shelf life stability. This particle size requirement is achieved by shearing of the pigment particles using small grinding media. Typical of the media used in the preparation of pigmented inks includes spherical particles made from stainless steel, zirconium silicate, zirconium oxide and glass. The high surface area particulate media used in this grinding process sometimes wears off into the ink dispersion, contaminating the final formulation. The contamination, depending on the type and quantity, can adversely affect ink performance. For example, the contamination can result in discoloration of color pigment formulations (particularly light colors, such as yellow), pH alteration as a result of the media reacting with formulation chemicals, difficult ink filtration, and a decrease in ink functional stability through the life of the print cartridge. Preferred grinding media are spherical ceramic particles having a highly smooth and uniform exterior surface, a high density and high hardness. A particularly preferred grinding medium for use in preparing the inks of the present invention is the material commercially available under the name YTZ Ceramic Beads, commercially available from S.E. Firestone Associates, Philadelphia, Pa. and manufactured by Nippon Kagaku Togyo. This material is in the form of spherical ceramic particles having a core of a high purity zirconium oxide treated with yttrium to make the spheres highly wear resistant. The particles are perfect spheres having a very smooth and uniform exterior surface, a density of 6.0 grams per cubic centimeter, and hardness of 91. Examples of processes for making such materials are described in Japanese Published Application 57-191234, published Nov. 25, 1982, and Japanese Published Application 56-145118, published Nov. 11, 1981, both incorporated herein by reference.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

EXAMPLE 1

An ink composition of the present invention, which utilizes the polymeric dispersant having the following general formula (referred to hereinafter as terpolymer L):

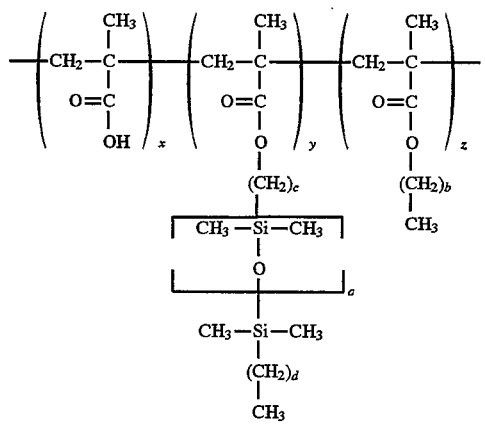

Terpolymer L is made as follows: A solution of methacrylic acid 22.8 g (265 mmol), monomethacryloxypropyl-terminated polydimethylsiloxane (PDMS-MA) 7.84 g (8.7 mmol, MW 900), stearyl methacrylate 2.95 g (8.7 mmol), dodecanethiol 2.06 g (9.9 mmol), dimethyl 2,2'-azobisisobutyrate 0.64 g (2.84 mmol) and isopropyl alcohol 100 mL is degassed with argon (done by repeated partial evacuation followed by argon backfill using a Firestone Valve) then heated to 70C for 16 hours. The mixture is allowed to cool to room temperature and then added slowly to rapidly stirred hexane 1.0 L. The resulting solid is isolated by vacuum filtration and dried in vacuum overnight at 80C. The yield of the reaction is about 85%. The co-polymer is characterized by proton NMR and GPC.

A stock solution of the dispersant is prepared as follows: A 400 mL beaker containing 40 g of DI water is set on a hot plate with a magnetic stirrer. Terpolymer L, 12 g, is added to the beaker while stirring, then 18 g of 20% KOH is added to the system. The mixture is heated to 50C for 2 hours. The pH is adjusted to 7.5, if needed, by addition of 20% KOH. DI water is then added to bring the weight of the stock solution to 100 g (12% terpolymer L).

| Components | Amount |
| --- | --- |
| Milbase Preparation A | |
| Carbon Black (Cabot Corp., Monarch 880) | 26.0 g |
| Terpolymer L stock solution | 54.0 g |
| DI Water | 100.0 g |
| Milbase Preparation B | |
| Carbon Black (Degussa Corp., Special Black 4A) | 26.0 g |
| Terpolymer L stock solution | 54.0 g |
| DI Water | 100.0 g |

Milbase Preparations A and B are made as follows. The components are premixed by mechanical stirring until there are no visible lumps. The mixture is dispersed by an attrition process using a Szegvari attritor model 01 std with 10–12 mesh zirconium silicate shot at a speed of 700 rpm. The attrition process is typically performed for a minimum of one hour, however, longer times at controlled temperature can also be used. The resulting ground milbase is removed from the attritor and let down, by the addition of deionized water, to a final percent solids of 12%.

Using the dispersion described in Milbase Preparation A, an ink composition having the following components is made:

4% (by weight) carbon black
1% terpolymer L
10% polyethylene glycol (MW=400)
10% 1,3-propanediol
75% DI water The ink composition is made using the following procedure:

(1) Mix DI water, PEG and 1,3-propanediol for 20 minutes.
(2) Add the ground milbase (Milbase Preparation A) to the mixture while stirring. Continue stirring for 20 minutes.
(3) Adjust the pH of the composition to 8.3 by the addition of 20% KOH.
(4) Filter to 1.2 μm.

This ink, when used in an ink jet printer, exhibits good maintenance characteristics, good optical density, and highly desirable printing characteristics when tested on six different representative types of paper.

EXAMPLE 2

Using Milbase Preparation B and the method of preparation described in Example 1, an ink composition having the following components is prepared:

3% carbon black
0.75% terpolymer L
14% polyethylene glycol (mw=400)
6% 1,3-propanediol
76.25% DI water This ink, when used in an ink jet printer, exhibits good optical density, has good maintenance characteristics, and exhibits highly deskable print characteristics when tested on six representative paper types.

EXAMPLE 3

Using Milbase Preparation A and the method of preparation described in Example 1, an ink composition having the components set forth below is prepared:

3% carbon black
0.75% terpolymer L
10% polyethylene glycol (mw=400)
10% 1,3-propanediol
76.25% DI water This ink, when used in a conventional ink jet printer, exhibits good maintenance characteristics, provides a printed product exhibiting a highly-desirable set of printing characteristics, including a good optical density.

EXAMPLE 4

Using Milbase Preparation B and the method of preparation described in Example 1, an ink composition having the components described below is prepared:

3% carbon black
1% terpolymer L
10% Liponic EG-1
10% 1,3-propanediol
76% DI water This ink, when used in a conventional ink jet printer, exhibits good maintenance characteristics, and has excellent print characteristics (including a good optical density) when used on a representative sampling of six papers.

EXAMPLE 5

Using Milbase Preparation B and the method of preparation described in Example 1, an ink composition having the following components is prepared:

3% carbon black
0.75% terpolymer L
10% 1,3-propanediol
10% polyethylene glycol (mw=400)
76.25% DI water This ink, when used in a conventional ink jet printer, exhibits good maintenance characteristics, and has a good optical density when tested on six representative types of paper.

EXAMPLE 6

Using the procedures described in Example 1, an ink composition having the following components is prepared:

3% carbon black (FW18, Degussa Corp., Ridgefield Park, N.J.)
0.75% terpolymer L
10% 1,3-propanediol
10% polyethylene glycol (mw=400)
76.25% DI water This ink, when used in a conventional ink jet printer, exhibits good maintenance characteristics, and has a good optical density when tested on six representative types of paper.

EXAMPLE 7

Using the procedures described in Example 1, an ink composition having the following components is prepared:

3% carbon black (FW18)
0.75% terpolymer L

10% 1,3-propanediol

10% Liponic EG-1

0.15% Kathon® PFM (biocide—Rohm & Haas)

76.10% DI water

This ink, when used in a conventional ink jet printer, exhibits good maintenance characteristics, and has a good optical density when tested on six representative types of paper.

EXAMPLE 8

Using the procedures described in Example 1, an ink composition having the following components is prepared:

3% carbon black (Special Black 4A)

0.75% terpolymer L

10% 1,4-butanediol

10% polyethylene glycol (mw=600)

0.2% n-propanol

75% DI water

This ink, when used in a conventional ink jet printer, exhibits good maintenance characteristics, and has a good optical density when tested on six representative types of paper.

What is claimed is:

1. An aqueous ink composition suitable for use in ink jet printers comprising:
   (a) from about 1% to about 10% by weight of a pigment;
   (b) from about 0.1% to about 10% by weight of a polymeric dispersant for said pigment;
   (c) from about 50% to about 93% by weight of an aqueous carrier; and
   (d) from about 5% to about 40% by weight of a cosolvent mixture comprising
      (1) 1,3-propanediol or 1,4-butanediol; and
      (2) a material selected from the group consisting of:
         (i) polyethylene glycols, and mixed poly(ethylene)(propylene) glycols, having a molecular weight of from about 200 to about 3,400;
         (ii) a polyol/polyalkylene oxide condensate having the formula

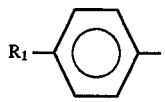

wherein X is H or $CH_3$, R is H, $C_1$–$C_4$ alkyl or $CH_2O(CH_2CH_2O)_eH$, b is 0 or 1, a+d+f (c+e) is from 2 to about 100, and f is from about 1 to about 6; and
         (iii) mixtures thereof;
wherein the weight ratio (1):(2) is from about 70:30 to about 30:70.

2. An ink composition according to claim 1 wherein the cosolvent mixture comprises
   (1) 1,3-propanediol or 1,4-butanediol; and
   (2) a material selected from the group consisting of
      (i) polyethylene glycol having molecular weight of from about 200 to about 3,400;
      (ii) the polyol/alkylene oxide condensate wherein X is hydrogen, R is hydrogen, b is 0, f is 1, and a+d+f (c+e) is 26; and
      (iii) mixtures thereof.

3. An ink composition according to claim 2 which contains from about 10% to about 20% by weight of said cosolvent mixture.

4. An ink composition according to claim 3 wherein, in the cosolvent mixture, the polyethylene glycol component (i) is polyethylene glycol having a molecular weight of about 400.

5. An ink composition according to claim 4 wherein the cosolvent mixture is a mixture of 1,3-propanediol and polyethylene glycol having a molecular weight of about 400.

6. An ink composition according to claim 4 wherein the weight ratio (1):(2) is about 50:50.

7. An ink composition according to claim 1 wherein the polymeric dispersant comprises in its backbone structural units selected from the group consisting of

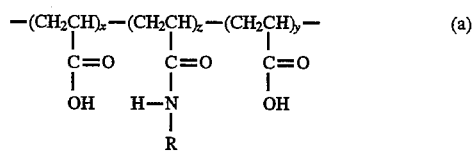

where x+y is from about 20 to about 200, z is from about 1 to about 10, and R is $C_6$–$C_{36}$ alkyl or

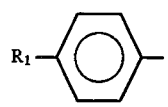

where $R_1$ is a $C_4$–$C_{20}$ alkyl;

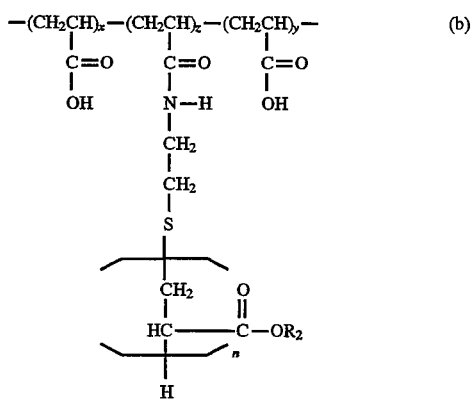

where x+y is from about 20 to about 200, z is from about 1 to about 10, n is from about 2 to about 40 and $R_2$ is alkyl or aryl; and

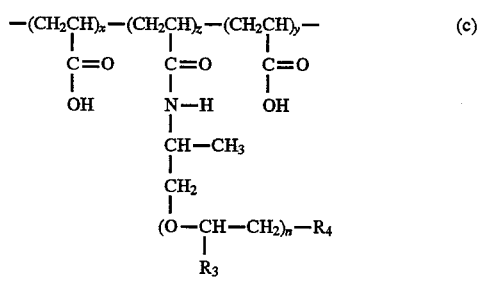

where x+y is from about 20 to about 200, z is from about 1 to about 10, $R_3$ is H or $CH_3$, $R_4$ is H, $CH_3$ or $OCH_3$, and n is from about 10 to about 60; or has the formula

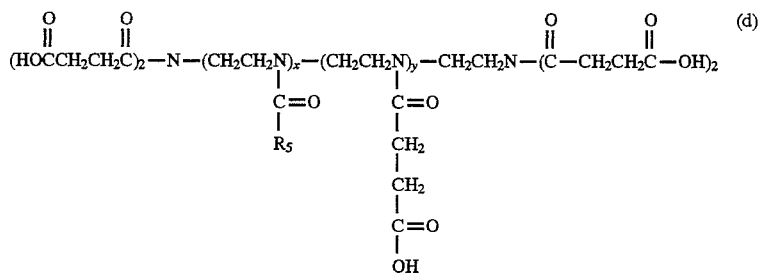

(d)

where y is from about 6 to about 20, x is from about 1 to about 5, and $R_5$ is a $C_6$–$C_{30}$ alkyl.

8. An ink composition according to claim 7 wherein the aqueous carrier is water or a mixture of water and an organic solvent selected from the group consisting of ethylene glycol, 1,2,6-hexanetriol, thiodiglycol, hexylene glycol, diethylene glycol, pentanediol, hexanediol, propylene glycol laurate, glycerol, ethylene glycol monomethyl ether, ethylene glycol monoethyl ether, diethylene glycol methyl ether, diethylene glycol ethyl ether, triethylene glycol monomethyl ether, triethylene glycol monoethyl ether, methanol, ethanol, propanol, butanol, acetone, tetrahydrafuran dioxane, ethyl acetate, sulfolanes, lactones, lactams and mixtures thereof.

9. An ink composition according to claim 8 wherein the pigment is selected from the group consisting of carbon black, titanium dioxide, iron oxide and color pigments.

10. An ink composition according to claim 9 which contains from about 0.5% to about 4% by weight of the insoluble pigment.

11. An ink composition according to claim 9 wherein the polymeric dispersant is a graft copolymer, having a molecular weight of from about 1,500 to about 20,000, comprising:
(a) a hydrophilic polymeric segment;
(b) a hydrophobic polymeric segment, having a molecular weight of from about 400 to about 3,000, which incorporates a hydrolytically stable siloxyl substituent; and
(c) a stabilizing segment having a molecular weight of from 200 to about 2,000, selected from the group consisting of reactive surfactant macromers, protective colloid macromers, and non-siloxyl hydrophobic monomers.

12. An ink composition according to claim 11 wherein the polymeric dispersant comprises in its backbone the formula

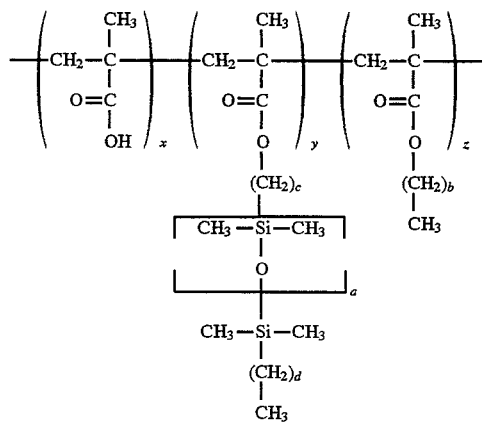

wherein x is from about 5 to about 100, y is from about 1 to about 2, z is from about 1 to about 5, a is from about 3 to about 45, b is from about 3 to about 29, c is from about 2 to 8, and d is from 0 to about 7.

13. An ink composition according to claim 11 wherein the cosolvent mixture comprises:
(1) 1,3-propanediol or 1,4 butanediol; and
(2) a material selected from the group consisting of:
  (i) polyethylene glycol having a molecular weight of from about 200 to about 3,400;
  (ii) a polyol/alkylene oxide condensate wherein X is hydrogen, R is hydrogen, b is 0, f is 1, and a+d+f (c+e) is 26; and
  (iii) mixtures thereof.

14. An ink composition according to claim 13 which contains from about 10% to about 20% by weight of the cosolvent mixture.

15. An ink composition according to claim 14 wherein the cosolvent mixture comprises:
(1) 1,3-propanediol; and
(2) a material selected from the group consisting of:
  (i) polyethylene glycol having a molecular weight of about 400;
  (ii) a polyol/alkylene oxide condensate wherein X is hydrogen, R is hydrogen, b is 0, f is 1, and a+d+f (c+e) is 26; and
  (iii) mixtures thereof.

16. An ink composition according to claim 15 wherein the weight ratio (1):(2) is about 50:50.

17. An ink composition according to claim 16 wherein the aqueous carrier is water or a mixture of water with an organic solvent selected from the group consisting of 1,5-pentanediol, 1,6-hexanediol, 1,7-heptanediol, n-propanol and mixtures thereof, wherein the aqueous carrier comprises from about 50% water/50% organic solvent to about 99.9% water/0.1% organic solvent and all percents are by weight.

18. A cosolvent mixture comprising:
(1) 1,3-propanediol or 1,4-butanediol; and
(2) a material selected from the group consisting of:
  (i) polyethylene glycols, and mixed poly(ethylene) (propylene) glycols, having a molecular weight of from about 200 to about 3,400;
  (ii) a polyol/polyalkylene oxide condensate having the formula

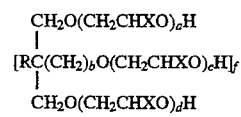

wherein X is H or $CH_3$, R is $H$,$C_1$–$C_4$ alkyl or $CH_2O$ $(CH_2CH_2O)_aH$, b is 0 or 1, a+d+f (c+e) is from about 2 to about 100, and f is from about 1 to about 6; and
  (iii) mixtures thereof;
wherein the weight ratio (1):(2) is from about 70:30 to about 30:70.

* * * * *

UNITED STATES PATENT AND TRADEMARK OFFICE
CERTIFICATE OF CORRECTION

PATENT NO : 5,656,071
DATED : August 12, 1997
INVENTOR(S) : William David Kappele and Anna Marie Pearson It is certified that error appears in the above-identified patent and that said Letters Patent is hereby corrected as shown below:

Col. 10, Line 35      Change "(e+e)" to read --(c+e) --.

In Claim 1, Col. 15, Line 45:      Change: 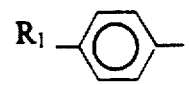

to read:

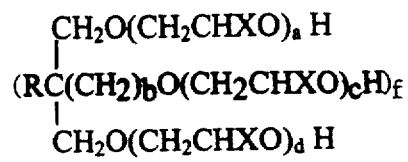

Signed and Sealed this

Seventh Day of April, 1998

Attest:

BRUCE LEHMAN

Attesting Officer      Commissioner of Patents and Trademarks